US005273304A

United States Patent [19]

Berkheimer

[11] Patent Number: 5,273,304

[45] Date of Patent: Dec. 28, 1993

[54] LEG MOBILIZED ATTACHMENTS FOR WHEELCHAIRS

[76] Inventor: John C. Berkheimer, 1779 Walden Pond Dr., Ft. Pierce, Fla. 34945

[21] Appl. No.: 958,810

[22] Filed: Oct. 9, 1992

[51] Int. Cl.5 ..... B60R 9/00

[52] U.S. Cl. ..... 280/304.1; 280/233; 297/DIG. 4; 482/60

[58] Field of Search ..... 280/304.1, 250.1, 233; 497/DIG. 4; 482/61, 60, 57

[56] References Cited

U.S. PATENT DOCUMENTS

| | | | |
|---|---|---|---|
| 3,423,086 | 1/1969 | Moore | 280/288.4 |
| 4,316,616 | 2/1982 | Boivin | 280/250.1 |
| 4,471,972 | 9/1984 | Young | 280/250.1 |
| 4,572,501 | 2/1986 | Durham et al. | 280/250.1 |
| 4,824,132 | 4/1989 | Moore | 280/250.1 |
| 5,066,032 | 11/1991 | Van Vooren et al. | 280/304.1 |
| 5,207,286 | 5/1993 | McKelvey | 280/304.1 |

*Primary Examiner*—Margaret A. Focarino
*Assistant Examiner*—Kevin Hurley
*Attorney, Agent, or Firm*—Carroll F. Palmer

[57] ABSTRACT

Leg-powered, foot-steerable devices for attachment to a wheelchair are disclosed that include a longitudinal pole unit, attachment clamps for releasably mounting the pole unit upon the frame of the wheelchair and a wheel assembly that includes a bearing unit carried by the pole unit, a pillar assembly carried by the bearing unit for limited rotation about a steering axis, an axle supported by the pillar assembly, at least one drive wheel carried by the axle for free rotation thereon and for limited rotation with the pillar assembly about the steering axis, and a pair of peddles fixed by opposed crank arms on opposite sides of the drive wheel for simultaneous rotation thereof by the feet of the wheelchair user about the steering axis and the axle.

14 Claims, 4 Drawing Sheets

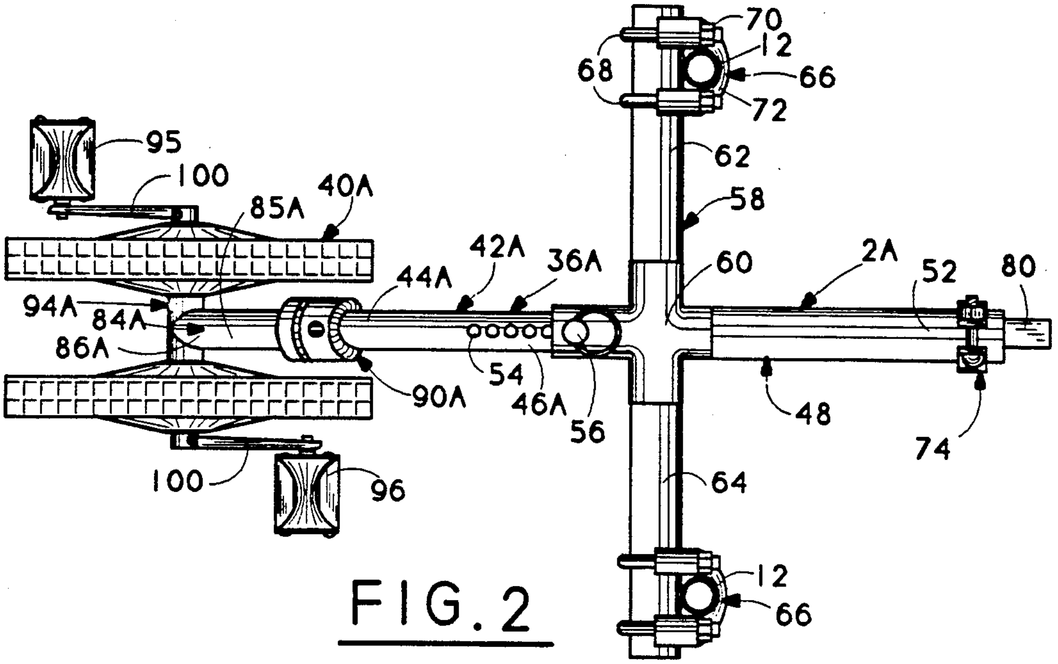
FIG. 2
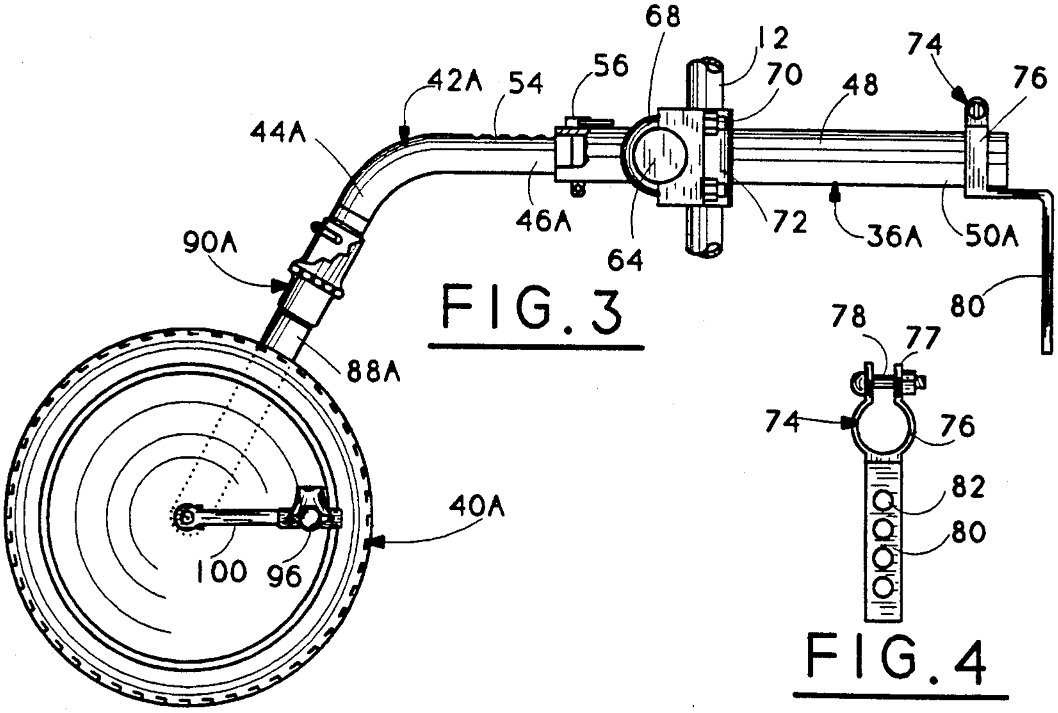
FIG. 3
FIG. 4

LEG MOBILIZED ATTACHMENTS FOR WHEELCHAIRS

BACKGROUND OF THE INVENTION

1. Field of the Invention

This application relates to leg mobilized attachments for wheelchairs. More particularly, it concerns leg peddalling attachments for invalid-type wheelchairs that enable users to convert host wheelchairs into leg powered and steered vehicles that additionally provide the user with therapeutic leg and lower body exercise.

2. Description of the Prior Art

Wheelchairs designed to transport permanently or temporarily disabled persons are well known items of commerce that come in a variety of forms. Thus, some are designed to convert from a folded mode for storage or transport when not in use into an unfolded mode for use by a disabled occupant, while others have a fixed frame construction that does not allow such conversion. Likewise, some have hand-wheels that permit self-propulsion by the user while others are designed only for third-party assisted propulsion. Additionally, wheelchairs come in several sizes to accommodate adults and children. The attachments of this invention may be used with virtually all such conventional wheelchairs.

In order to provide wheelchair users with added ways of propelling them and/or obtaining physical exercise during their occupancy, a variety of wheelchair attachments has been developed. For example, U.S. Pat. No. 4,720,117 discloses an attachment to the front of wheelchairs by which the user may propel and steer the host wheelchairs by the users arms. Other exercising, propelling or steering attachments for wheelchairs are disclosed in U.S. Pat. No. 3,423,086; 3,485,510; 4,241,932; 4,572,501 and 5,066,032. Of related interest is U.S. Pat. No. 4,659,098 which discloses a bicycle in which a semi-recumbent bicyclist peddles a drive wheel located ahead of the front steering wheel.

The present invention furthers advances the art of wheelchair modification with improvements in leg operated, propelling/steering attachments.

OBJECTS

A principal object of the invention is the provision of improved leg operated attachments for wheelchairs.

Further objects include the provision of:

1. Leg operated attachments for invalid-type wheelchairs that enable users to convert host wheelchairs into leg powered and steered vehicles.

2. Such attachments that additionally provide the user with therapeutic leg and other body exercise.

3. Leg operated attachments for wheelchairs that do not require removal of castering front wheels for operation or elimination of other wheelchair parts for connection to the wheelchairs.

4. Attachments that may be applied to foldable wheelchairs and can be readily detached therefrom to permit conversion to the folded mode for storage or transport.

5. New wheelchair attachments that can be readily adjusted to accommodate users of different sizes or wheelchairs of different dimensions and configurations.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of leg-powered, foot-steerable devices for attachment to wheelchairs. Typically, the wheelchair has (1) a frame defined by a front frame section and a rear frame section with such frame including vertically extending frame members and longitudinally extending frame members, (2) first and second rear wheels carried by at least some of the vertically extending frame members to rotate in planes parallel to the longitudinal axis, (3) first and second castering front wheels and (4) seat means to support a user in the wheelchair.

New devices of the invention can be securely attached without need to eliminate any parts from the wheelchair and, if the wheelchair is of the foldable type, they do not prevent this feature from being utilized.

Basically, the new devices comprise (A) a longitudinal pole unit, (B) attachment means for releasably mounting the pole unit and (C) a wheel assembly.

A longitudinal pole unit of the invention has a fore section defined by a first front end portion and a first rear end portion plus an aft section defined by a second front end portion and a second rear end portion.

In preferred embodiments, the fore section and the aft section of the longitudinal pole unit are tubes, the fore section is partially arcuate in shape and the aft section is straight throughout its length. Also, the fore section of the pole unit telescopes into the aft section and the aft section carries pin means to fix the telescoped position of the fore section relative to the aft section.

The attachment means is structured for releasably mounting the aft section of the pole unit upon the frame longitudinally aligned with the longitudinal axis of the wheelchair and includes a transverse elongated first rigid member, e.g., a solid bar or rigid metal tube, defined by a first right end and a first left end. Such first rigid member is suitably attached to the first front end portion of the fore section of the pole unit. Clamps, e.g., U-clamps, are associated with such first right and left ends to fasten them to frame members of the frame.

The attachment means further includes a transverse elongated second rigid member, e.g., a metal bar, having a second right end, a second left end and a central section integrally joining the second right and left ends. The second rigid member is attached to the second rear end portion of the aft section of the pole unit. In a preferred embodiment, the second right and left ends extend normally from the central section giving the second rigid member a U-shape and such second right and left ends are fastened to some of the vertically extending frame members of the frame, e.g., by nuts on axles carrying the rear wheels on vertically extending frame members of the wheelchair. Instead of ordinary nuts and U-clamps, quick release type fasteners can be used with foldable wheelchairs so that the devices of the invention may be quickly detached to permit the wheelchair to be changed into the folded mode for storage or transport.

A wheel assembly of the invention includes (A) a bearing unit supported upon the first front end portion of the fore section of the pole unit, (B) pillar means defined by an upper end and a lower end, the upper end being carried by the bearing unit for limited rotation about a steering axis and the lower end supporting axle means, (C) at least one drive wheel carried by the axle means for free rotation thereon and for the limited rotation with the pillar means about the steering axis, and (D) a pair of peddles fixed by opposed crank arms on opposite sides of the drive wheel for simultaneous rotation thereof by the feet of the user about the steering axis and the axle means.

Drive wheels of the new devices can be of any suitable construction, but advantageously are wire spoke wheels or a solid disc wheels. Such drive wheels may be carried by the axle means as a side-by-side pair, instead of as a single wheel.

BRIEF DESCRIPTION OF THE DRAWINGS

A more complete understanding of the invention can be obtained by reference to the accompanying drawings in which:

FIG. 2 is a plan view of a first embodiment of a leg operated, wheelchair attachment of the invention.

FIG. 3 is a lateral view of attachment of FIG. 2.

FIG. 4 rear elevational view of a fastener unit of the attachment of FIG. 2.

DESCRIPTION OF THE PREFERRED EMBODIMENTS

Figure 1:
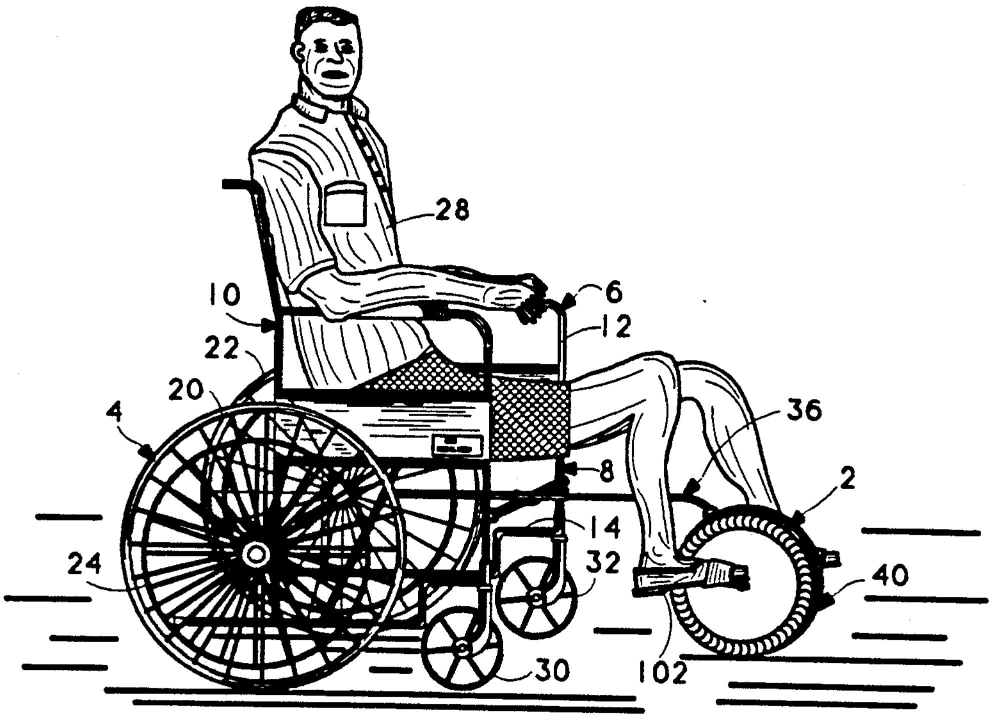
FIG. 1 is perspective, lateral view of a conventional invalid wheelchair equipped with a leg operated attachment of the invention.

Referring in detail to the drawings, in which identical parts are all numbered the same, the leg-powered, foot-steerable device 2 of the invention is attached to wheelchair 4 which has a frame 6 defined by a front frame section 8 and a rear frame section 10.

Figure 7:
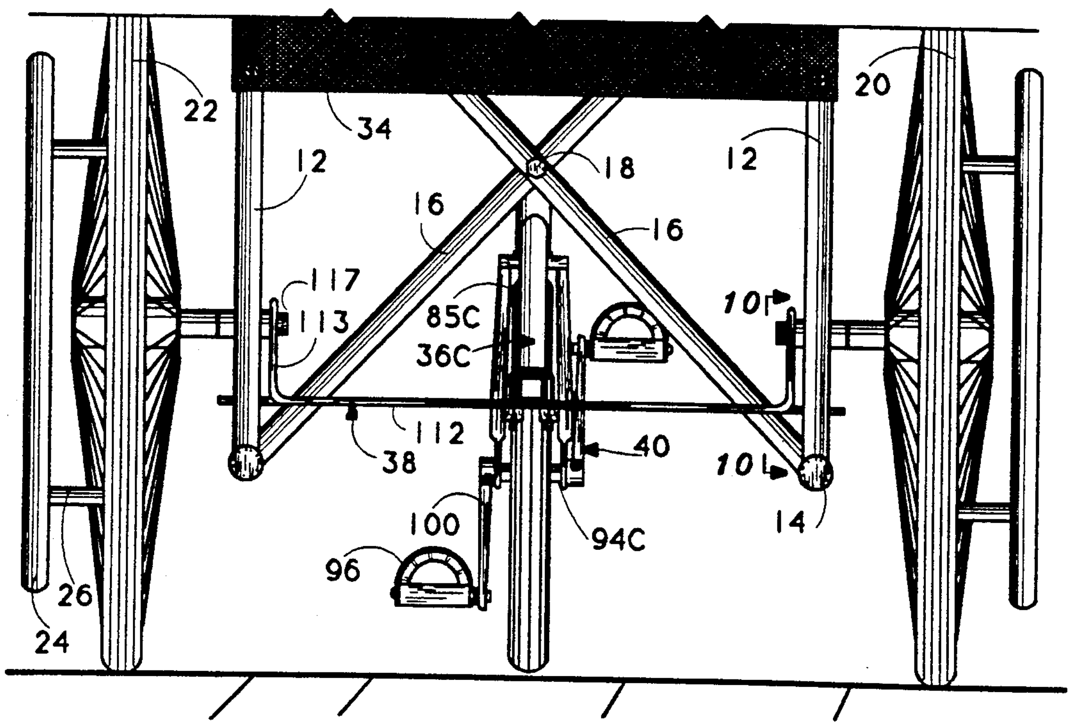
FIG. 7 is a fragmentary, rear elevational view of a third embodiment of a leg operated, wheelchair attachment of the invention.

The frame 6 includes vertically extending frame members 12 and longitudinally extending frame members 14. In preferred wheelchairs of the foldable type, the frame 6 typically includes angled frame members 16 pivoted on a bolt 18 for movement between an unfolded mode as shown in FIG. 7 and a folded mode not shown.

First and second rear wheels 20 and 22 respectively are carried by the vertically extending frame members 12 to rotate in planes parallel to the longitudinal axis of the wheel chair. Hand wheels 24 are typically mounted by lugs 26 outboard of the rear wheels 20 & 22 by which the occupant 28 may propel the wheelchair 4 with his arms.

Further major components of the wheelchair 4 are first and second castering front wheels 30 and 32 respectfully plus seat means 34 to support the user 28 in the wheelchair 4.

Basically, the device 2 comprises a longitudinal pole unit 36, attachment means 38 and a wheel assembly 40.

With reference to the first embodiment device 2A of FIGS. 2-4, pole unit 36A comprises a tubular fore section 42A with a front end portion 44A and a rear end portion 46A plus a tubular aft section 48 with a front end portion 50 and a rear end portion 52.

The fore section 42A, which includes a series of bores 54, telescopes into the aft section 48A that carries pin means 56 to fix the telescoped position of the fore section relative to the aft section.

Attachment means 58, which serves to releasably mount the aft section 48A upon the frame 6 longitudinally aligned with the longitudinal axis of the wheelchair 4, comprises a tubular X-member 60 fastened, such a by welding (not shown), to aft section 48A that supports right lateral right and left tubes 62 & 64 respectively. Clamps 66, composed of U-bolts 68, nuts 70 and housing 72, serve to fasten the tubes 62 & 64 to vertical tubular frame members 12. Quick release clamps (not shown) may be used in place of clamps 66.

Attachment means 58A further includes clamp means 74 by which the rear end portion 50A may be attached to a part of frame 6, e.g., an angled frame member 16. Clamp means 74 consists of ring section 76, lugs 76, bolt 78 and dependent strap 80 containing bores 82.

The wheel assembly 40A comprises pillar means 84A includes tube 85A having a lower end 86A and upper end 88A carried by bearing unit 90A for rotation, limited by pin means 92, about a steering axis that coincides with the longitudinal axis of tube 85A.

The lower end 86A supports axle means 94A that carries right and left drive wheels 95 & 96 respectively for free rotation thereon and for the limited rotation with tube 85A about the steering axis.

A pair of peddles 98 fixed by opposed crank arms 100 on opposite sides of the solid disc drive wheels 95 & 96 for simultaneous rotation thereof by the feet 102 of the user 28 about the steering axis and the axle means 94A.

Figure 5:
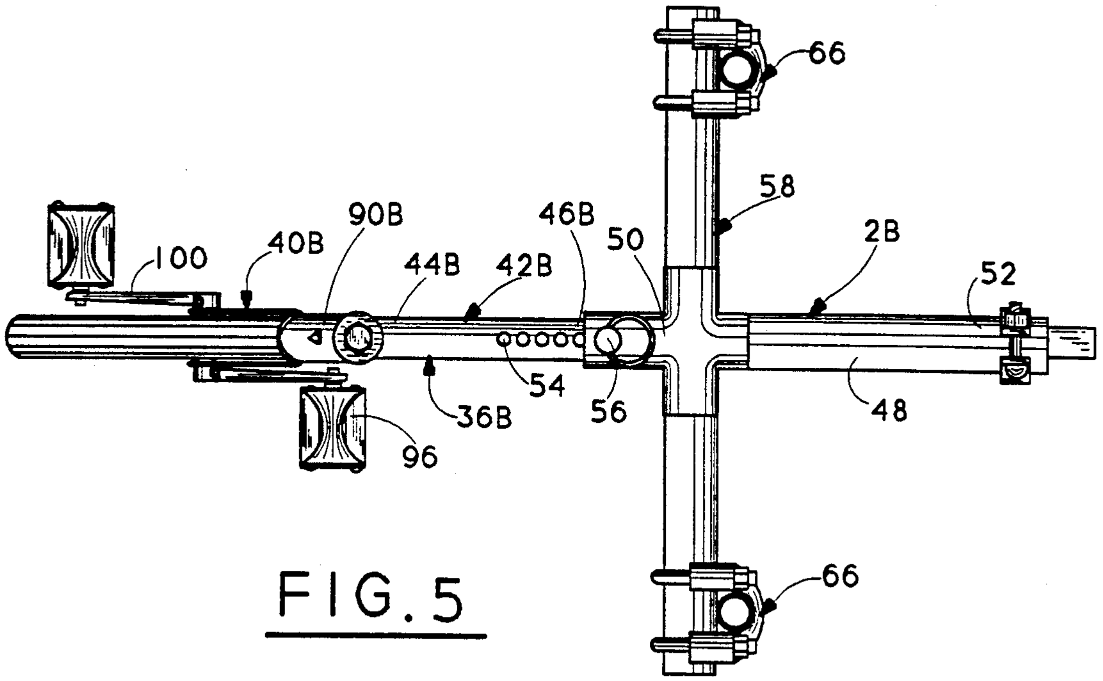
FIG. 5 is a plan view of a second embodiment of a leg operated, wheelchair attachment of the invention.
Figure 6:
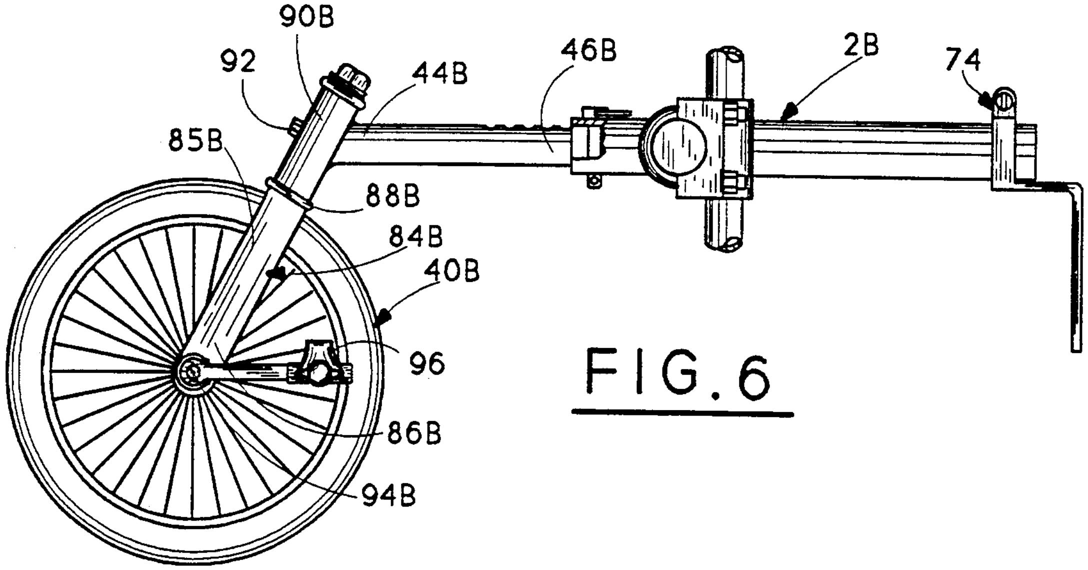
FIG. 6 is a lateral view of attachment of FIG. 5.
Figure 8:
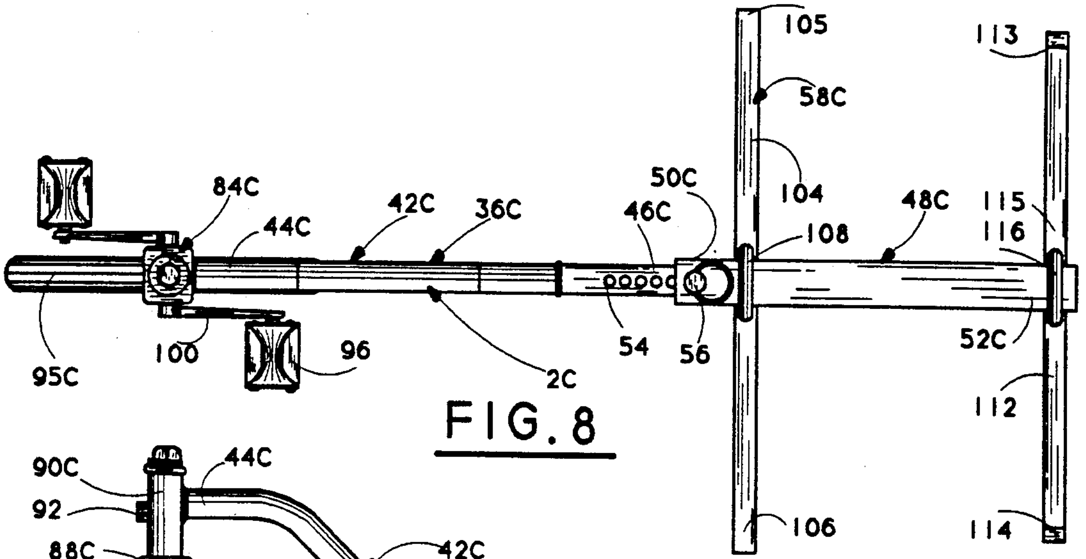
FIG. 8 is plan view of the third embodiment.
Figure 9:
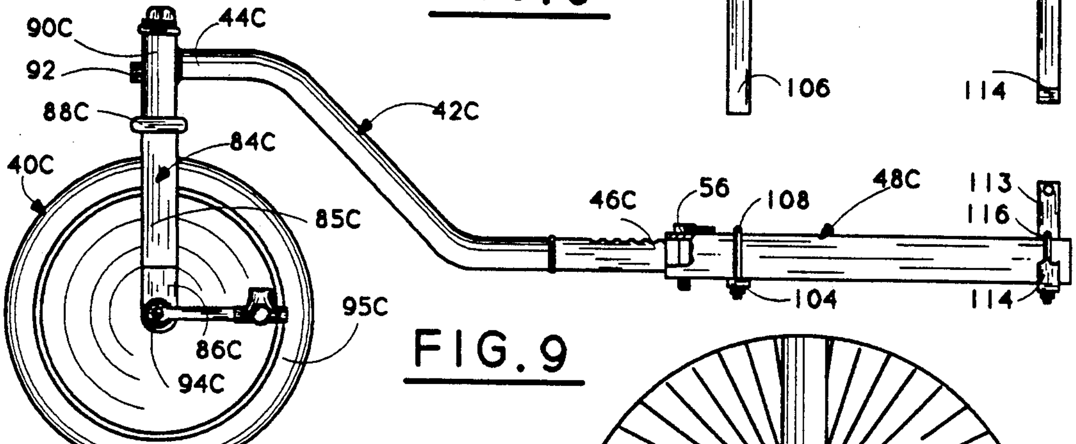
FIG. 9 is a lateral view of the third embodiment.
Figure 10:
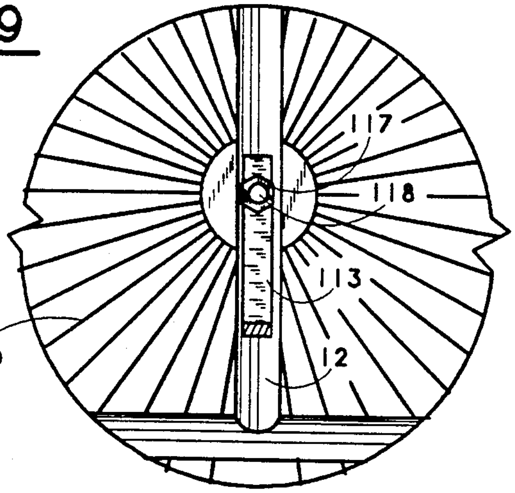
FIG. 10 is a fragmentary, sectional view taken on the line 10—10 of FIG. 7.
Figure 11:
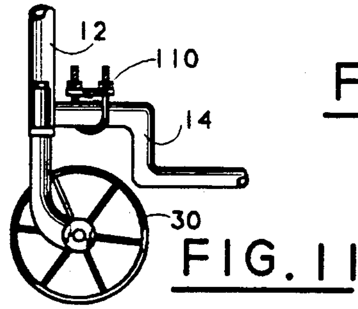
FIG. 11 is a fragmentary view of a forward, left portion of the third embodiment as installed on a wheelchair as in FIG. 7.
Figure 13:
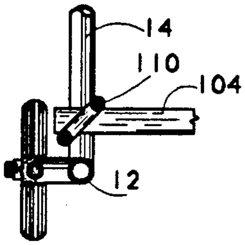
FIG. 13 is a fragmentary plan view corresponding to the lateral view of FIG. 11.
Figure 12:
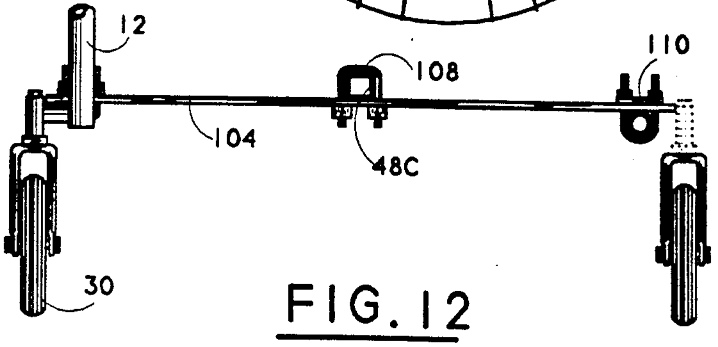
FIG. 12 is a fragmentary, front elevational view of the forward, left portion of the third embodiment as installed on a wheelchair as in FIG. 7.

With reference to the second embodiment device 2B of FIGS. 5 & 6, pole unit 36B comprises a tubular fore section 42B with a front end portion 44B and a rear end portion 46B plus a tubular aft section 48 with a front end portion 50 and a rear end portion 52.

The fore section 42B which, includes a series of bores 54, telescopes into the aft section 48B that carries pin means 56.

Attachment means 58, clamps 66 and clamp means 74 of device 2B are like those of device 2A.

The wheel assembly 40B comprises pillar means 84B includes yoke member 85B having a lower end 86B and upper end 88B carried by bearing unit 90B for rotation, limited by pin means 92, about a steering axis that coincides with the longitudinal axis of yoke member 85B.

The lower end 86B supports axle means 94B that supports drive wheel 95B for free rotation thereon and for the limited rotation with yoke member 85B about the steering axis.

A pair of peddles 98 fixed by opposed crank arms 100 on opposite sides of the solid disc drive wheel 95B for simultaneous rotation thereof by the feet 102 of the user 28 about the steering axis and the axle means 94B.

With reference to the third embodiment device 2C of FIGS. 8-13, pole unit 36C comprises a tubular fore section 42C with a front end portion 44C and a rear end portion 46C plus a tubular aft section 48C with a front end portion 50C and a rear end portion 52C.

The fore section 42C which, includes a series of bores 54, telescopes into the aft section 48C that carries pin means 56.

Attachment means 58C includes front transverse bar 104 with right end 105 and left end 106 which is attached to front end portion 50C by U-clamp 108 while bar ends 105 and 106 are fastened to frame members 14 of the frame 6 by U-clamps 110.

Attachment means further includes rear transverse bar 112 having a right end 113, left end 114 and central section 115 integrally joining the second right and left ends. Bar 112 is attached to rear end 52C of aft section 48C by U-clamp 116. The right and left ends 113 & 114 extend normally from the central section 115 giving the bar 112 a U-shape and these ends are fastened by nuts 117 on axles 118 carrying the rear wheels 20 on vertically extending frame members 12. Wing nuts (not shown) may be used in place of standard nuts 117 for faster assembly or knockdown, particularly with foldable wheelchairs.

The wheel assembly 40C comprises pillar means 84C includes yoke member 85C having a lower end 86C and upper end 88C carried by bearing unit 90C for rotation, limited by pin means 92, about a steering axis that coincides with the longitudinal axis of yoke member 85C.

The lower end 86C supports axle means 94C that supports drive wheel 95C for free rotation thereon and for the limited rotation with yoke member 85C about the steering axis.

A pair of peddles 98 fixed by opposed crank arms 100 on opposite sides of the solid disc drive wheel 95C for simultaneous rotation thereof by the feet 102 of the user 28 about the steering axis and the axle means 94C.

The drive wheels of the new wheelchair attachments of the invention may be of a solid disc type as shown in FIG. 3 or wire spoke type as shown in FIG. 6.

The new leg operated wheelchair attachments 2 of the invention enable users to convert host wheelchairs into leg powered and steered vehicles that provide the user with therapeutic leg and other body exercise. They do not require removal of the castering front wheels 30 for operation of the wheelchair nor elimination of other wheelchair parts for connection to the wheelchairs.

I claim:

1. A leg-powered, foot-steerable device for attachment to a wheelchair without need to eliminate parts from the wheelchair that is defined in part by a central longitudinal axis and has (1) a frame defined by a front frame section and a rear frame section and includes vertically extending frame members and longitudinally extending frame members, (2) first and second rear wheels carried by at least some of said vertically extending frame members to rotate in planes parallel to said longitudinal axis, (3) first and second castering front wheels and (4) seat means to support a user in said wheelchair, said device comprising:

A. a longitudinal pole unit having
  - a fore section defined by a first front end portion and a first rear end portion and
  - an aft section defined by a second front end portion and a second rear end portion,
  - said fore section telescoping into said aft section, B. attachment means for releasably mounting said aft section of said pole unit upon said frame longitudinally aligned with said longitudinal axis and C. a wheel assembly including
  - a bearing unit supported upon said first front end portion,
  - pillar means defined by an upper end and a lower end, said upper end being carried by said bearing unit for limited rotation about a steering axis and said lower end supporting axle means,
  - at least one drive wheel carried by said axle means for free rotation thereon and for said limited rotation with said pillar means about said steering axis, and
  - a pair of peddles fixed by opposed crank arms on opposite sides of said drive wheel for simultaneous rotation thereof by the feet of said user about said steering axis and said axle means.

2. The device of claim 1 for attachment to a wheelchair wherein a pair of drive wheels are carried by said axle means.

3. The device of claim 1 wherein said aft section carries pin means to fix the telescoped position of said fore section relative to said aft section.

4. The device of claim 1 wherein said drive wheel is a wire spoke wheel.

5. The device of claim 1 wherein said drive wheel is a solid disc wheel.

6. The device of claim 1 wherein said attachment means for releasably mounting said aft section includes a transverse elongated first rigid member defined by a first right end and a first left end, said rigid member being attached to said first front end portion.

7. The device of claim 6 wherein said attachment means further includes clamps associated with said first right and first left ends to fasten them to frame members of said frame.

8. The device of claim 6 wherein said attachment means further includes a transverse elongated second rigid member defined by a second right end, a second left end and a central section integrally joining said second right and left ends, said second rigid member being attached to said second rear end portion.

9. The device of claim 8 wherein said second right and left ends are fastened to some of said vertically extending frame members of said frame.

10. The device of claim 1 wherein said fore section and said aft section of said longitudinal pole unit are tubes.

11. The device of claim 10 wherein said fore section telescopes into said aft section.

12. The device of claim 11 wherein said fore section is partially arcuate in shape.

13. The device of claim 11 wherein said aft section is straight throughout its length.

14. A leg-powered, foot-steerable device for attachment to a wheelchair without need to eliminate parts from the wheelchair that is defined in part by a central longitudinal axis and has (1) a frame defined by a front frame section and a rear frame section and includes vertically extending frame members and longitudinally extending frame members, (2) first and second rear wheels carried by at least some of said vertically extending frame members to rotate in planes parallel to said longitudinal axis, (3) first and second castering front wheels and (4) seat means to support a user in said wheelchair, said device comprising:

A. a longitudinal pole unit having
  - a fore section defined by a first front end portion and a first rear end portion and
  - an aft section defined by a second front end portion and a second rear end portion, B. attachment means for releasably mounting said aft section of said pole unit upon said frame longitudinally aligned with said longitudinal axis and C. a wheel assembly including a bearing unit supported upon said first front end portion, pillar means defined by an upper end and a lower end, said upper end being carried by said bearing unit for limited rotation about a steering axis and said lower end supporting axle means, right and left drive wheels carried by said axle means for free rotation thereon and for said limited rotation with said pillar means about said steering axis, a first peddle fixed by a first crank arm on the right side of said right drive wheel and a second peddle fixed by a second crank arm on the left side of said left drive wheel, said peddles being opposed for simultaneous rotation thereof by the feet of said user about said steering axis and said axle means.

* * * * *